United States Patent
Spector (10) Patent No.: US 7,975,924 B2
(45) Date of Patent: Jul. 12, 2011

(54) COMPUTER GENERATED BOOKMARKS FOR SCANNING AND TRANSMISSION TO PLATFORM AGGREGATOR OR SEARCH ENGINE TO ADD ADDITIONAL INFORMATION TO PRINTED MATERIAL

(75) Inventor: Donald Spector, New York, NY (US)

(73) Assignee: Vancloos AG, Limited Liability Company, Wilmington, DE (US)

( * ) Notice: Subject to any disclaimer, the term of this patent is extended or adjusted under 35 U.S.C. 154(b) by 383 days.

(21) Appl. No.: 12/184,578

(22) Filed: Aug. 1, 2008

(65) Prior Publication Data

US 2009/0032578 A1 Feb. 5, 2009

Related U.S. Application Data

(60) Provisional application No. 60/954,003, filed on Aug. 4, 2007.

(51) Int. Cl.
*G06K 7/10* (2006.01)
(52) U.S. Cl. ............... 235/462.01; 235/375; 235/487
(58) Field of Classification Search ............ 235/462.01, 235/375, 383, 385, 487, 462.09
See application file for complete search history.

(56) References Cited

U.S. PATENT DOCUMENTS

| | | | |
|---|---|---|---|
| 5,926,116 | A | 7/1999 | Kitano et al. |
| 6,108,656 | A | 8/2000 | Durst et al. |
| 6,964,374 | B1 | 11/2005 | Djuknic et al. |
| 2002/0063150 | A1 | 5/2002 | Nygren et al. |
| 2003/0019939 | A1 | 1/2003 | Sellen |
| 2003/0111531 | A1 | 6/2003 | Williams |
| 2003/0173405 | A1 | 9/2003 | Wilz, Sr. et al. |
| 2004/0140361 | A1* | 7/2004 | Paul et al. ............... 235/462.45 |
| 2004/0258275 | A1 | 12/2004 | Rhoads |
| 2005/0011957 | A1 | 1/2005 | Attia et al. |
| 2005/0082376 | A1* | 4/2005 | Lubow et al. ............... 235/494 |
| 2006/0124742 | A1* | 6/2006 | Rines et al. ............. 235/462.01 |
| 2006/0151592 | A1* | 7/2006 | Poor ........................... 235/375 |
| 2006/0258397 | A1 | 11/2006 | Kaplan et al. |
| 2007/0203859 | A1* | 8/2007 | Chatte et al. ............... 705/410 |
| 2008/0071618 | A1* | 3/2008 | Weisz et al. ............... 705/14 |

* cited by examiner

*Primary Examiner* — Edwyn Labaze (57) ABSTRACT

Embodiments of the invention are directed to methods of conveying information related to a printed publication. A label having a readable code for attachment to or insertion into a printed publication is used. A reader adapted to read the code on the label or insert and to communicate the code to a computer or device including a microcomputer may be incorporated. An internet site or platform is adapted to receive the code from the computer or a device including a microcomputer and correlate the code to the information. The information related to the code can be displayed at the computer or device including a microcomputer.

32 Claims, 7 Drawing Sheets

COMPUTER GENERATED BOOKMARKS FOR SCANNING AND TRANSMISSION TO PLATFORM AGGREGATOR OR SEARCH ENGINE TO ADD ADDITIONAL INFORMATION TO PRINTED MATERIAL

STATEMENT OF RELATED U.S. CASES

This application claims the benefit of priority under 35 U.S.C. §119(e) to U.S. Provisional Patent Application Ser. No. 60/954,003, filed Aug. 4, 2007, the disclosure of which is incorporated by reference as if set forth herein.

BACKGROUND

This invention relates to the field of publishing and more specifically to "Bookmarks" that have a specific code that can be read by a scanner and transmitted to a platform, a database or a search engine through the internet.

Previous applications have described systems in which printed material could be generated with special bookmarks which can translate to hyperlinks that could be picked up by a scanner transmitter and delivered over short distances to a cell phone, PDA, laptop, desktop or other synced microprocessor. While these systems can be used to stream lectures and discussions of the work that could be used for college or other academic credit, they did not form a viable business system to create the materials, because relatively few books are in publication and the republication costs per book are high.

There remains a need in the art for methods and systems to link printed materials with supplemental content.

SUMMARY

The present invention looks to the area of scanning large numbers of books and new programs that have been developed which through some artificial intelligence can create a table of contents to organize the subject matter of the book in a variety of formats, not necessarily those subjects thought of at the time of publishing, but even those new fields and areas that can be added at a later time. These programs are now used in conjunction with PowerPoint® presentations to generate courses curriculums and even quizzes based on the subject area being taught.

At the same time these tables of content can be automatically generated, various coded imprints can be generated alongside them that can refer to a platform, code or other site that a scanner transmitter can transmit to a synced receiver and deliver this new information, which can be in print or multimedia form, or even the streaming of video lectures.

In this scenario a large number of books can be scanned, the tables of content automatically generated, depending on the types of information available for a particular subject and those encrypted signals (codes) can be displayed alongside each item in the computer generated table of contents. This table of contents can be stickered or added to an existing book.

There has been some degree of concern about Google's desire to scan every book and make the information available on the net. The problems with this system are that it is in violation of copyright laws and there has been a major protest. However, with expanding technology, building an interactive table of contents that can be stickered or added to any book and provides a series of hyperlinks to the appropriate subject matter will quickly enhance the value of almost any printed material. Still pictures, can now instantly access videos. Brief descriptions can call up streaming lectures, to provide contact hours for long distance learning. In fact, this system can instantly change the publishing industry and the hardware can be sold and with or without the permission or work of the publishers can be stickered or attached to existing works and allow hyperlinks of media-rich material to virtually any form of print.

It is also believed that this system will enhance the value of libraries to deliver a direct connection outside of the domain of print, and with complete scanning, automation will make the world of print, in short term seamless with the all bibliographies, references, and multimedia materials, or lectures that are relevant.

In one such scenario a person buys the new version of Bookpod, a scanner transmitter that has either a universal receiver, a receiver that can be WiFi, WiMax, Bluetooth or even specific to the brand or style of bookpod. A person can go to our platform and specify a book that is within the group that has been retrofitted for this technology, a process that can be automatically done by scanning and creating a group of fields. These fields can be instantly matched by search engines against available material either publicly available or for sale. The appropriate symbol with encryption is then printed on the sticker or supplemental printed matter for a specific book. When scanned the bookmark automatically matches its hyperlink and starts delivering the new material.

This process is relatively easy to start up as a business and will have dramatic value for schools, educational facilities as well as all printed materials, including magazines and newspapers in the future creating a seamless link between printed material and the material that is searchable or stored on a platform though our system.

Accordingly, one or more embodiments of the invention is directed to methods of conveying information related to a printed publication. The method comprises providing a label for attachment to or insertion into the printed publication, the label including a readable code. A reader is provided, the reader adapted to read the code on the label or insert and to communicate the code to a computer or device including a microcomputer. An internet site or platform is provided which is adapted to receive the code from the computer or a device including a microcomputer and correlate the code to the information. The information is displayed to the code at the computer or device including a microcomputer. In other aspects, the method includes receiving a request for a coded label from a customer.

Other embodiments of the invention are directed to systems for teaching using multimedia. The systems include a printed publication having content; a web site or platform having access to information related to the content of the printed publication; a reader mechanism; and a label attached or inserted in to the printed publication, the label having a code that can be read by the reader mechanism.

Additional embodiments of the invention are directed to methods of teaching using multimedia-based information associated with one or more topics of a printed publication. The methods comprise receiving a request from a customer for at least one label having a readable code associated with the one or more topics; providing the at least one label having a readable code to the customer; providing an internet site or platform adapted to receive the code from a user's computer and to correlate the code with the one or more topics; and redirecting the user to an internet site or a hyperlink that provides information about the one or more topics.

DETAILED DESCRIPTION

As used in this specification and the appended claims, the singular forms "a", "an" and "the" include plural referents unless the context clearly indicates otherwise. Thus, for example, reference to "a label" includes a combination of two or more labels, and the like.

As used in this specification and the appended claims, "internet" refers not only to the Internet, but also to any wide area network or local area network. Use of the term "internet" is not intended to limit the present invention to communications received via the world wide web.

As used in this specification and the appended claims, "printed publication" refers to any printed material. Non-limiting examples of printed publications include, books, magazines, comic books and newspapers.

As used in this specification and the appended claims, "information related to a printed publication" means information pertaining to or related to the topics contained within the printed publication. Non-limiting examples include supplemental information, advertisements, bibliographic references, multimedia presentations, etc. Excluded from this list is point-of-sale information. An example of point-of-sale information is the price information related to a book which may be received by a cash register when a store clerk scans the bar code.

Figure 1:
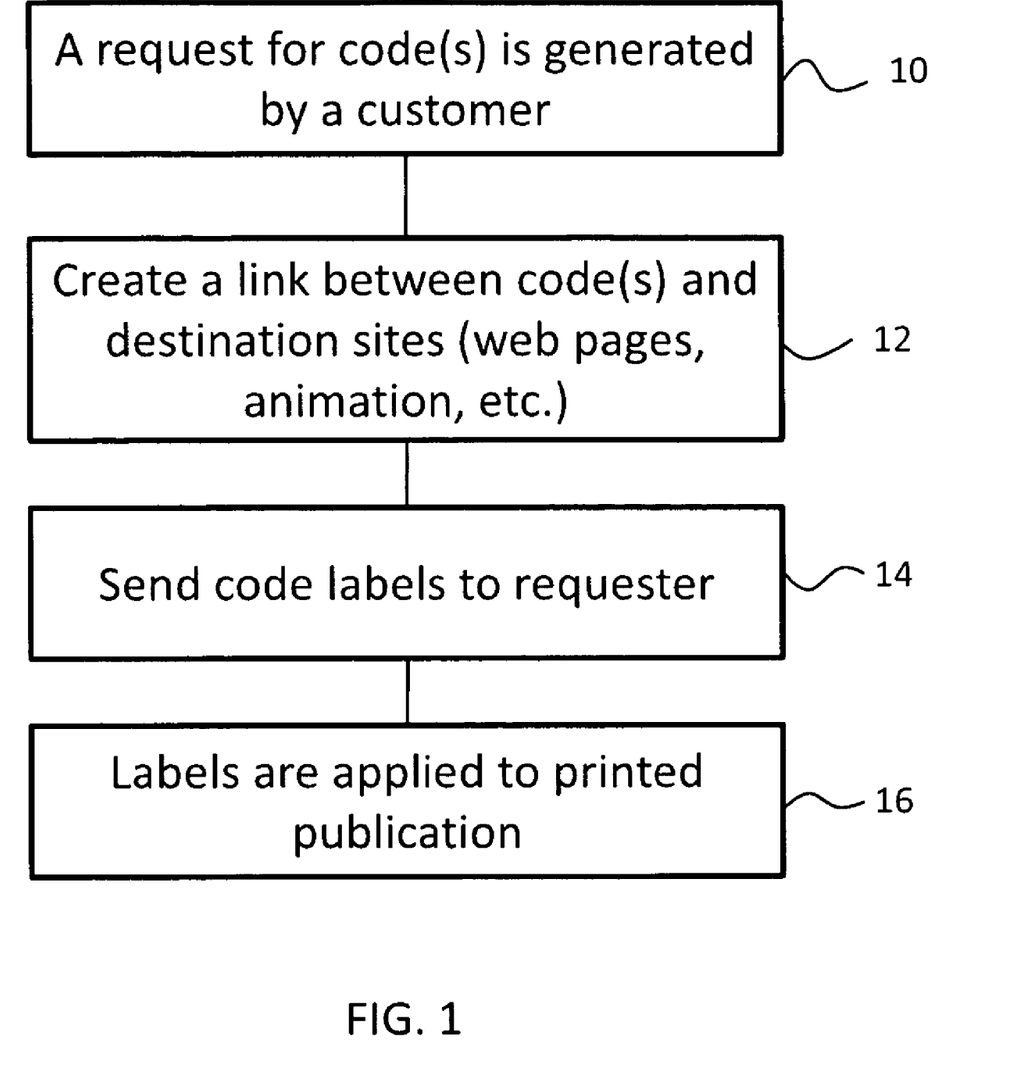
FIG. 1 illustrates steps for applying a coded label to a printed publication.
Figure 2:
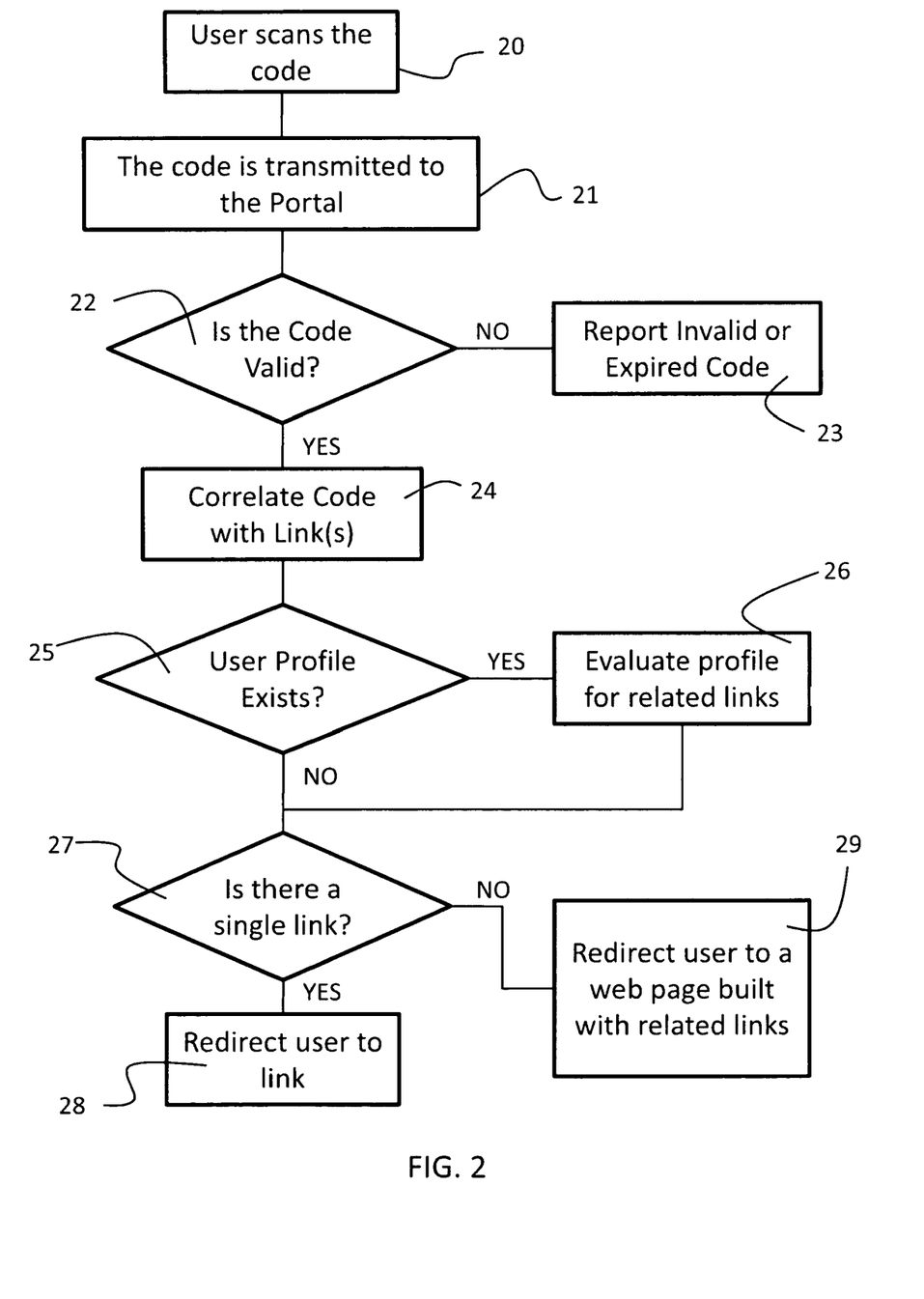
FIG. 2 illustrates a method of learning using coded labels.
Figure 3:
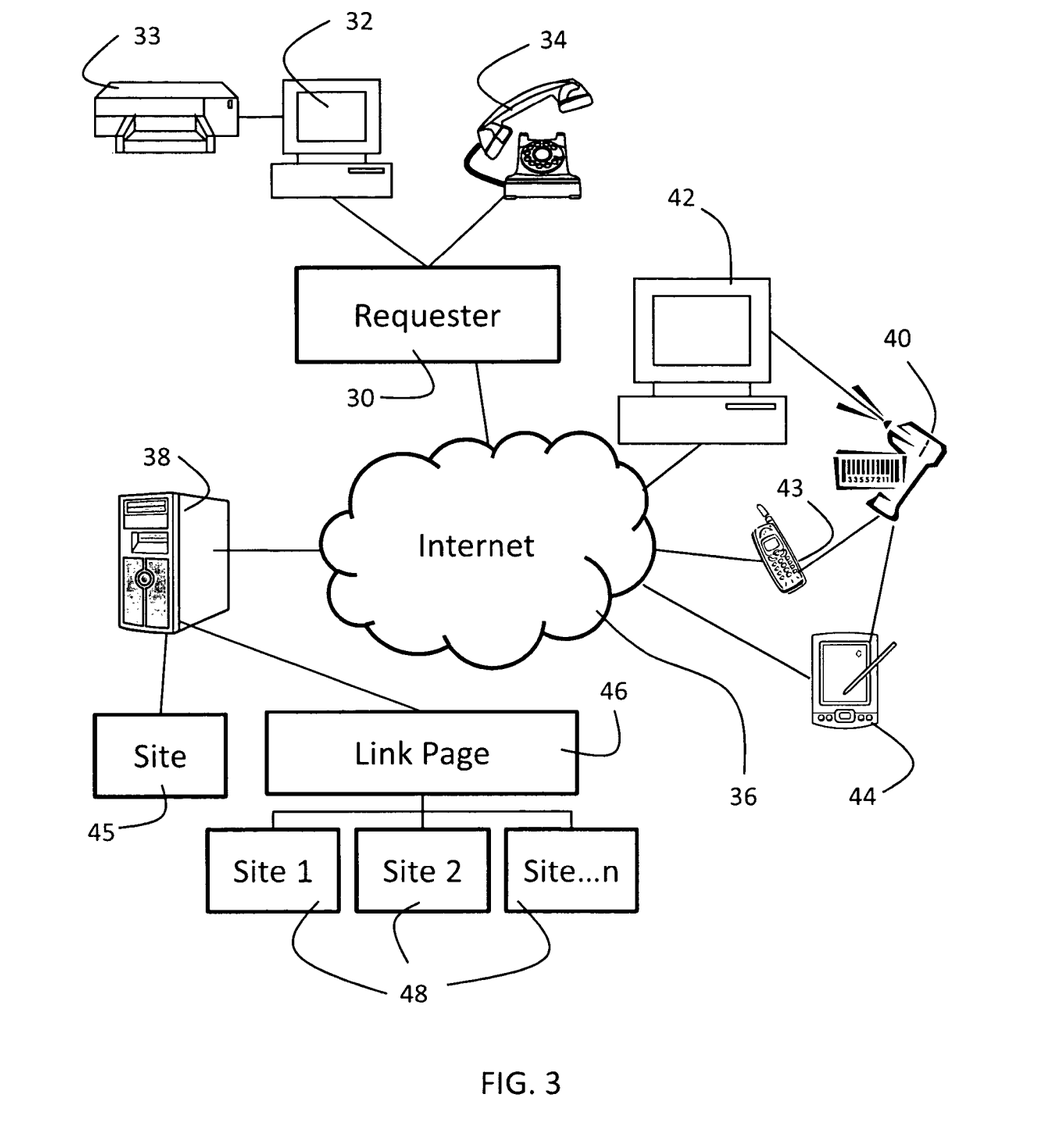
FIG. 3 is a schematic of the methods illustrated in FIGS. 1 and 2.

Aspects of the invention are described with reference to FIGS. 1-3. FIG. 1 shows a method of providing a coded label to a requester. FIG. 2 shows a method of retrieving information related to the printed publication based on the coded label. FIG. 3 shows a schematic of the methods in FIGS. 1 and 2.

In step 10, a person or organization, calls the requester 30, requests one or more coded labels to be connected to designated supplemental content. The request can be made using a computer 32, telephone 34 or other suitable communication means. A request made by computer 32 is transmitted over the internet 36, or suitable computer network, to a portal server 38.

In step 12, the server 38, or person using the server 38, establishes a connection between a code and the supplemental content desired by the requester 30. The code-content connection can be of permanent or limited duration, as desired by the requester 30. For example, a requester 30 may desire to have a temporary coupon campaign associated with a newspaper add. This code-content connection would be setup to expire after a specified period of time.

In step 14, coded labels are transmitted to the requester 30. This transmission can be done using regular mail or over the internet 36, or suitable network. If delivered by regular mail, the requester 30 might provide the number of labels needed. These labels would be printed and delivered to the requester 30. If electronic delivery is desired, a document could be sent to the requester 30 which would be printed onto, for example, standard labels using a normal printer 33. This would allow the requester 30 to create the exact number of labels that would be needed. The request and label delivery may also be done using a stand-alone software application.

Once the labels have been received or printed by the requester 30, the labels are applied to a printed publication, as in step 16. The labels may be applied by the publisher of the printed publication, or the end user. For example, a comic book publisher may add the labels to select comic books prior to shipping, or a student may apply labels to a text book purchased at a school bookstore.

Once the labels are in place, a user scans 20 the coded label using a scanner 40 which is able to interpret the code. The scanner 40 can be connected to a personal computer 42, a cell phone 43, a personal digital assistant 44 or other suitable device. In step 21, the code can then be transferred by the computer 42, cell phone 43, PDA 44 or other device through the internet 36 or other network to the portal server 38. The connection of the scanner 40 with the computer 42 can be wired or wireless connection. In some embodiments, the scanner can be built into the cell phone 43 or PDA 44.

As shown in step 22, the server 38 validates the code. If the code is invalid or expired the server will report an invalid or expired code message to the user 23. If the code is found to be valid in step 22, the server 38 correlates the code with the supplemental content 24. In step 25, the server 38 will determine if there is a profile for the user. If a profile exists, the server 38 will assess the profile 26 to determine if additional links should be added to the link(s) associated with the specific code. The server 38 then determines if there is a single link to supplemental content or if there are multiple links in step 27. If there is a single link 45, the server 38 redirects the user to the linked supplemental content in step 28. If there is more than one link to supplemental content found in step 27, the server 38 will create a web page 46 with links to all of the supplemental content sites 48. The server 38 will then return the link page 46 to the user in step 29. When a single link is found in step 27, the server acts a portal, being transparent to the user, automatically transferring the user to the desired supplemental content.

Figure 4A:
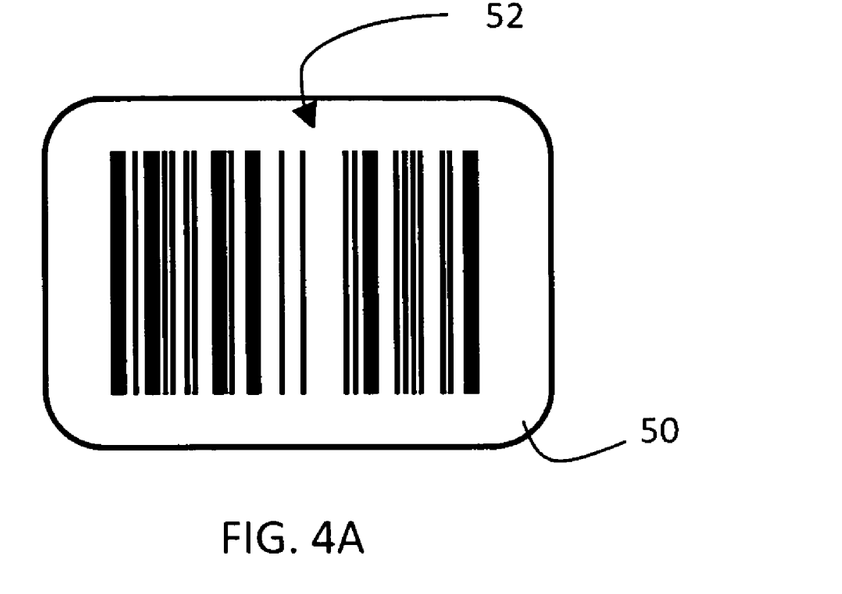
FIGS. 4A and 4B illustrate coded labels according to various aspects of the invention.
Figure 4B:
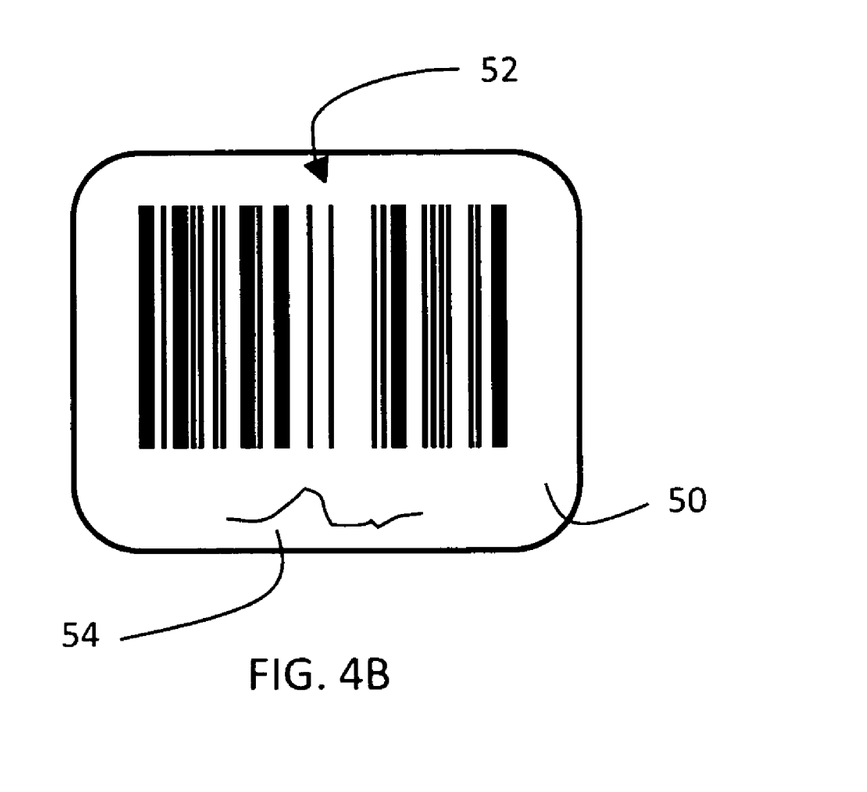

FIGS. 4A and 4B show examples of labels that can be used in accordance with aspects of the present invention. FIG. 4A shows a label 50 having a code 52 which would correlate to supplemental content. The code may be a bar code (shown) or any other suitable code. The label, as shown in FIG. 4B may also contain text 54 which can identify the linked supplemental content. For example, if the label is applied to an anatomy text book, the label may be linked to a site which includes the entire table of contents with individual hyperlinks therein, or to a specific multimedia presentation of a heart beating. In the second scenario, the label might have text 54 saying "Heart" to alert the user to the intended content related to the code. This is especially useful when there are multiple labels associated with a single printed publication, as shown in FIG. 6.

Figure 5A:
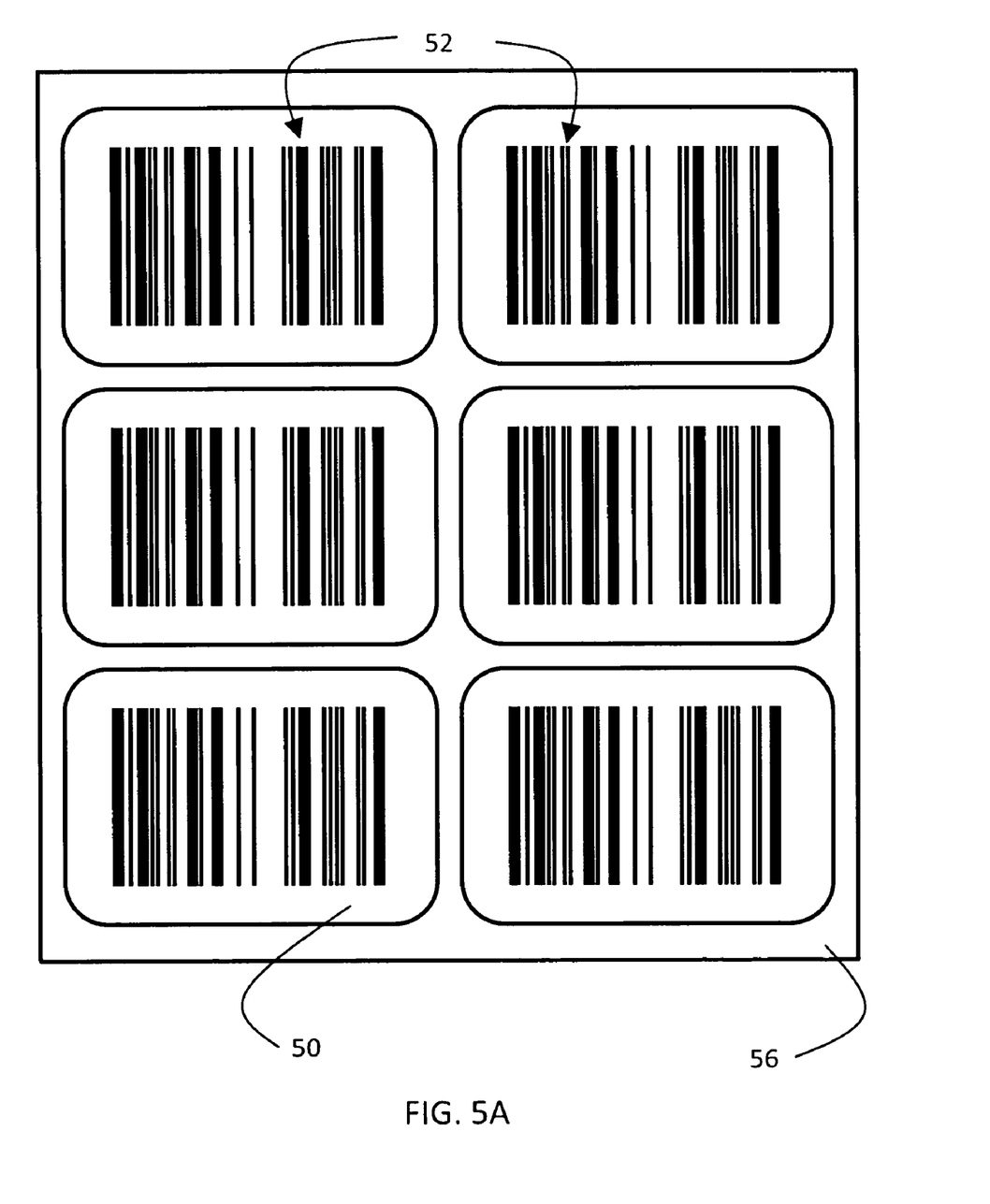
FIGS. 5A and 5B illustrate coded label sheets in accordance with one or more aspects of the invention.
Figure 5B:
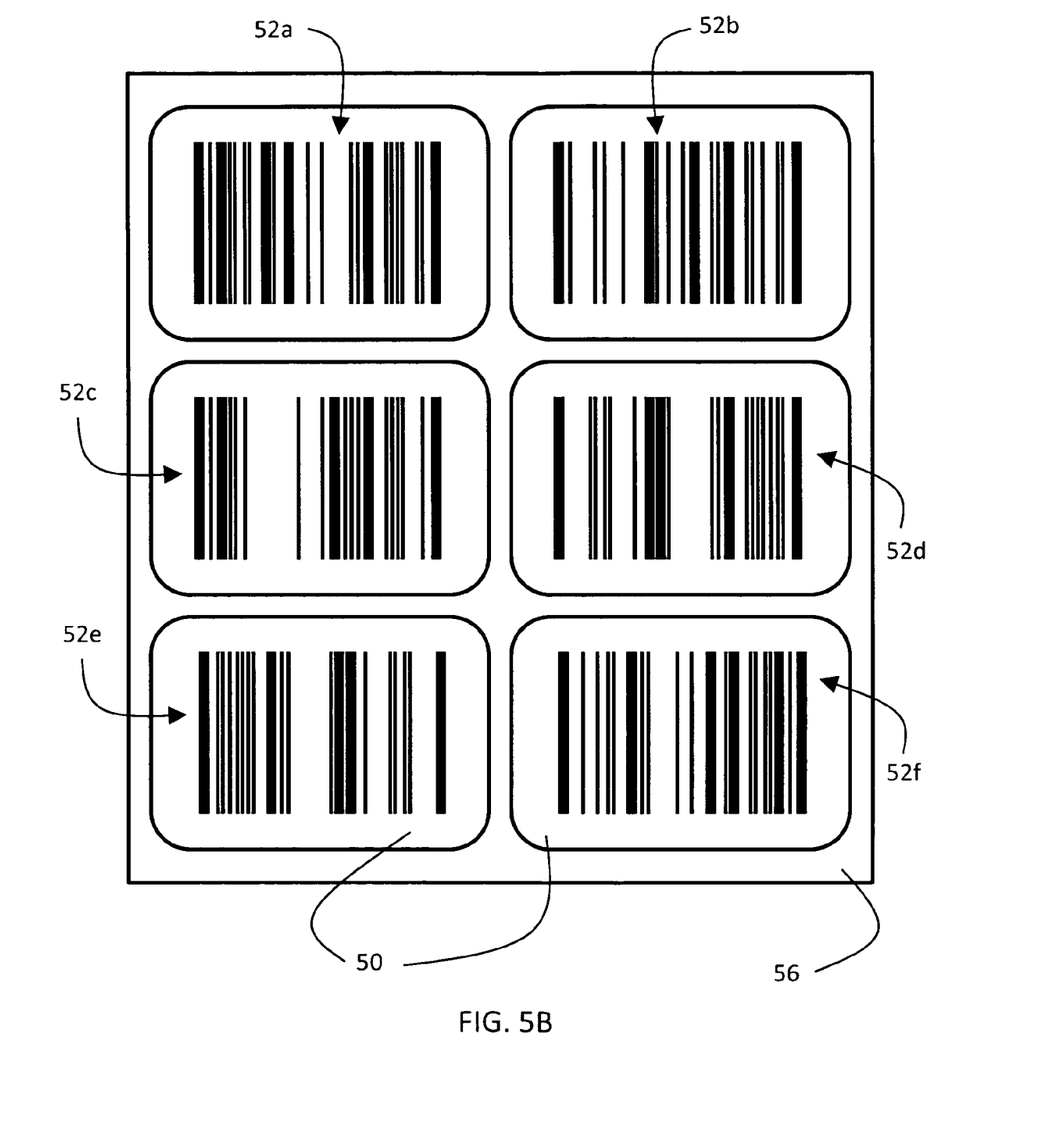

FIGS. 5A and 5B show examples of sheets of labels that can be used in accordance with aspects of the present invention. FIG. 5A shows a sheet 56 of labels 50. Each label 50 has the same code 52. This is a useful configuration where the requester needs many copies of a single label. FIG. 5B shows a sheet 56 of labels 50 where each label has a different code 52a-52f. These embodiments are useful where a sheet of labels is provided with a book (i.e., a college textbook) with the intention that the user will apply the labels to the book. It may be useful in these scenarios to have text on the labels which identifies the intended content. For example, the labels may have a page number printed on each, identifying which page of the printed publication the content is intended to supplement.

Figure 6:
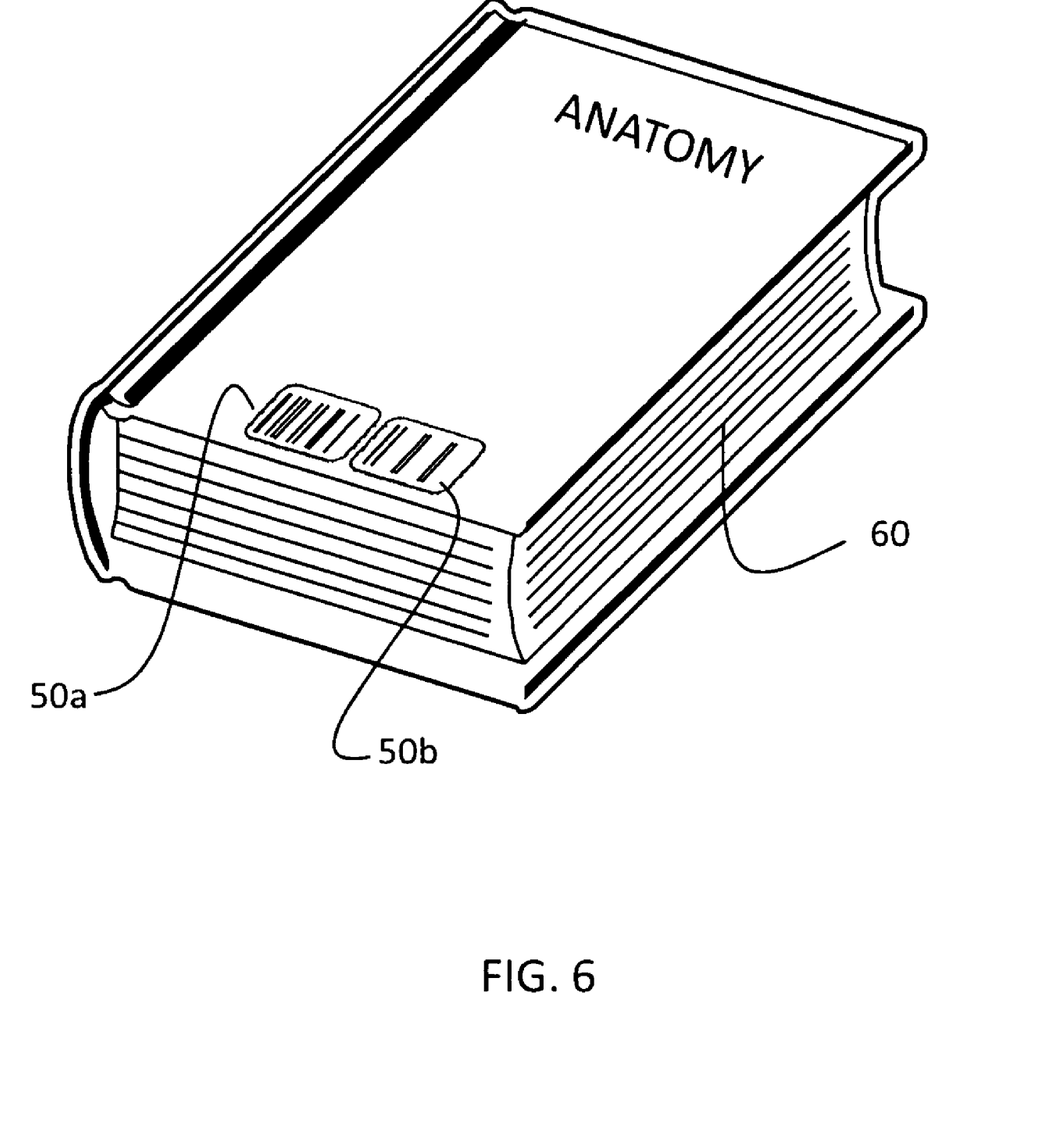
FIG. 6 illustrates a printed publication with coded labels.

FIG. 6 shows an example Anatomy book 60 illustrating the usefulness of these aspects. The book 60 has two labels 50a, 50b on the cover. These labels may be applied by the printer, the book store, the end user, or any intermediate person. Each label shown has a different code which will direct the user to different supplemental content. For example, one label may take the user to a site with a video of an autopsy while the other may present the user with a multimedia self-quiz. There is no limitation to the usefulness and substance of the supplemental content.

Accordingly, one or more embodiments of the invention is directed to methods of conveying information related to a printed publication. The method comprises providing a label for attachment to or insertion into the printed publication, the label including a readable code. A reader is provided, the reader adapted to read the code on the label or insert and to communicate the code to a computer or device including a microcomputer. An internet site or platform is provided which is adapted to receive the code from the computer or a device including a microcomputer and correlate the code to the information. The information is displayed to the code at the computer or device including a microcomputer. In other aspects, the method includes receiving a request for a coded label from a customer.

In some embodiments, the code can be setup to expire after a specified period of time. For example, an advertisement may be placed in a magazine with the code which when accessed would provide a discount coupon. The advertiser can decide to stop the discount program after a couple months. The code can then be used again at a later time.

In some aspects, a plurality of labels is provided to the requester. Each label can have the same code or different codes, depending on the desired usage. For example, a university book store may request a roll of labels with the same code to be applied to the cover of every text book. Additionally, the same book store may request a sheet of ten labels, or any number desired, to be included with the sale of a specific text book.

In some aspects, pages on the internet site or platform can be supplied for third-party promotional materials associated with the code. For example, a code label may be placed on a text book which would take the student to a commercial site which sells additional materials associated with the text book. The information on any code related site can be provided by the author or publisher of the printed publication or by a third party.

According to other aspects, the label can be provided to the requester electronically. This could be done by emailing a file which could be printed onto standard labels, or an electronic link to a site which would allow the labels to be printed. Additionally, stand-alone software may be used to allow the requester to access the portal and request labels. The stand-alone software could then generate printouts of the labels.

In various aspects, the information displayed is computer generated from a search based on user requests or generated from a user profile. This allows the system to remember a user by either requiring a login, or through cookies, or some other mechanism. The portal can then evaluate interests of the specific user and add additional links which may be associated with the code. For example, if a person has a particular interest in neurology, the portal may add additional neurology-related links when a code is scanned, if the links would be relevant to the scanned code. So that while there may be a list of links for a sport magazine, either by direct request, or by a profile, a consumer interested in golf, links related to golf may be added.

Other embodiments of the invention are directed to systems for teaching using multimedia. The systems include a printed publication having content; a web site or platform having access to information related to the content of the printed publication; a reader mechanism; and a label attached or inserted in to the printed publication, the label having a code that can be read by the reader mechanism.

In some aspects, the system also includes a computer or device including a microcomputer. The computer or device that contains a microcomputer can transfer the code to the portal. The connection between the reader and the computer, or device having a microcomputer, can be either a physical connection or a wireless connection.

Additional embodiments of the invention are directed to methods of teaching using multimedia-based information associated with one or more topics of a printed publication. The methods comprise receiving a request from a customer for at least one label having a readable code associated with the one or more topics; providing the at least one label having a readable code to the customer; providing an internet site or platform adapted to receive the code from a user's computer and to correlate the code with the one or more topics; and redirecting the user to an internet site or a hyperlink that provides information about the one or more topics.

The various embodiments and aspects of the invention described here can be employed individually or in conjunction with other embodiments and aspects. Descriptions of individual aspects and embodiments does not preclude the inclusion of other aspects, embodiments or additional structural components.

It is to be understood that the invention is not limited to the details of construction or process steps set forth in the following description. The invention is capable of other embodiments and of being practiced or being carried out in various ways.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A method comprising:
    reading, with a reading mechanism, a code from a label, wherein the label is attached to a previously printed publication;
    providing the code to a network server that has access to supplemental content regarding the previously printed publication; and
    receiving, from the network server, a plurality of links, wherein the plurality of links link to the supplemental content regarding the previously printed publication, wherein the supplemental content is associated with the code from the label, and wherein at least one of the links is associated with a user profile.

2. The method of claim 1, further comprising transmitting a request for the label.

3. The method of claim 1, wherein the supplemental content expires after a set period of time.

4. The method of claim 1, further comprising displaying the supplemental content through a computing device.

5. The method of claim 1, wherein the supplemental content comprises promotional materials associated with the code.

6. The method of claim 1, wherein the supplemental content is provided by a third party relative to the previously printed publication.

7. The method of claim 1, wherein the supplemental content is provided by an author or a publisher of the previously printed publication.

8. The method of claim 1, further comprising receiving the label, wherein the label is received electronically.

9. The method of claim 1, wherein the supplemental content is computer generated from a search based on received requests or generated from a profile.

10. The method of claim 1, wherein the previously printed publication is a textbook.

11. A system comprising:
- a reader mechanism configured to read a code from a label, wherein the label is attached to a previously printed publication;
- a transmitter configured to provide the code to a network server that includes supplemental content regarding the previously printed publication; and
- a receiver configured to receive, from the network server, a plurality of links, wherein the plurality of links link to the supplemental content regarding the previously printed publication, wherein the supplemental content is associated with the code from the label, and wherein at least one of the links is associated with a user profile.

12. The system of claim 11, wherein the receiver is further configured to electronically receive the label.

13. The system of claim 11, wherein the supplemental content expires after a set period of time.

14. The system of claim 13, further comprising a processor, wherein the reader mechanism is connected to the processor through a wireless connection.

15. The system of claim 11, further comprising a processor, wherein the reader mechanism is connected to the processor through a physical connection.

16. A system comprising:
- means for reading a code from a label, wherein the label is attached to a previously printed publication;
- means for providing the code to a network server that includes supplemental content regarding the previously printed publication; and
- means for receiving, from the network server, a plurality of links, wherein the plurality of links link to the supplemental content regarding the previously printed publication, wherein the supplemental content is associated with the code from the label, and wherein at least one of the links is associated with a user profile.

17. The system of claim 16, wherein the supplemental content comprises information about one or more topics that are relevant to the previously printed publication.

18. The system of claim 16, wherein the code expires a defined time after a first use of the code.

19. The system of claim 16, further comprising means for electronically receiving the label.

20. The system of claim 16, wherein the supplemental content includes an internet site or a hyperlink that is generated based at least in part on a profile.

21. A method comprising:
- providing a label for attachment to a previously printed publication, wherein the label includes a readable code;
- receiving, at a receiver of a network server device, a first request from a computing device, wherein the first request includes at least the readable code;
- identifying a plurality of links, wherein the plurality of links link to supplemental content associated with the previously printed publication, wherein the supplemental content is identified based at least in part on the readable code received with the first request, and wherein at least one of the links is associated with a user profile; and
- providing the plurality of links to the computing device in response to the first request.

22. The method of claim 21, further comprising receiving a second request for the label from the computing device.

23. The method of claim 21, wherein the supplemental content comprises a hyperlink.

24. The method of claim 21, further comprising determining whether the readable code is expired prior to providing the supplemental content to the computing device.

25. The method of claim 21, wherein the supplemental content originates from an author or a publisher of the previously printed publication.

26. A system comprising:
- a transmitter configured to provide a label for attachment to a previously printed publication, wherein the label includes a readable code, and wherein the label is provided to a computing device;
- a receiver configured to receive a first request from the computing device, wherein the first request includes at least the readable code; and
- a processor configured to identify a plurality of links, wherein the plurality of links link to supplemental content associated with the previously printed publication, wherein the supplemental content is identified based at least in part on the readable code received with the first request, and wherein at least one of the links is associated with a user profile; and
- wherein the transmitter is further configured to provide the plurality of links to the computing device in response to the first request.

27. The system of claim 26, wherein the receiver is further configured to receive a second request for the label from the computing device.

28. The system of claim 26, wherein the processor is further configured to determine whether the readable code is expired prior to providing the supplemental content to the computing device.

29. The system of claim 26, wherein the supplemental content comprises a network webpage.

30. A system comprising:
- means for providing a label for attachment to a previously printed publication, wherein the label includes a readable code;
- means for receiving a request from a computing device, wherein the request includes at least the readable code;
- means for identifying a plurality of links, wherein the plurality of links link to supplemental content associated with the previously printed publication, wherein the supplemental content is identified based at least in part on the readable code received with the first request, and wherein at least one of the links is associated with a user profile; and
- means for providing the plurality of links to the computing device in response to the request.

31. The system of claim 30, further comprising means for determining whether the readable code is expired prior to providing the supplemental content to the computing device.

32. The system of claim 30, wherein the supplemental content comprises a hyperlink to promotional materials.

* * * * *